T. J. KEHOE.
OIL GAGE.
APPLICATION FILED MAY 23, 1917.
1,390,358.
Patented Sept. 13, 1921.
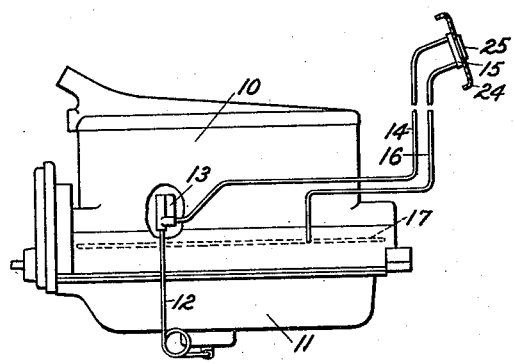
Fig. I.
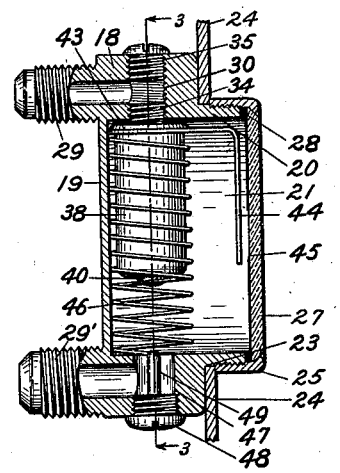
Fig. II.
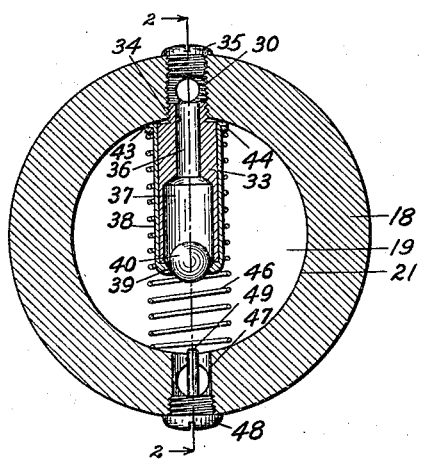
Fig. III.
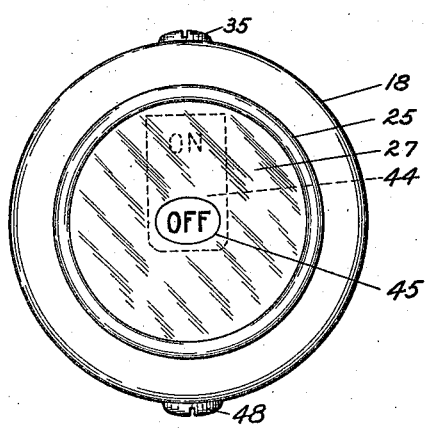
Fig. IV.
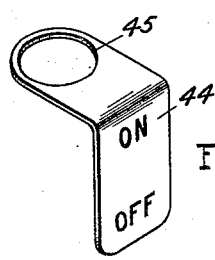
Fig. V.
INVENTOR.
Thomas J. Kehoe
BY Chester H Broselton
ATTORNEY

UNITED STATES PATENT OFFICE.

THOMAS J. KEHOE, OF TOLEDO, OHIO, ASSIGNOR TO THE WILLYS-OVERLAND COMPANY, OF TOLEDO, OHIO.

OIL-GAGE.

1,390,358.          Specification of Letters Patent.    Patented Sept. 13, 1921.

Application filed May 23, 1917. Serial No. 170,472.

*To all whom it may concern:*

Be it known that I, THOMAS J. KEHOE, a citizen of the United States, residing at Toledo, in the county of Lucas and State of Ohio, have invented certain new and useful Improvements in Oil-Gages, of which I declare the following to be a full, clear, and exact description.

This invention relates to lubricating systems and particularly to those of internal combustion engines where it is especially important to feed the lubricant with certainty and regularity, and where it is especially necessary that any stoppage in the lubricating system, which interferes with its feeding, should be automatically indicated at once.

The principal object of this invention is to provide an improved oil gage, to be connected in the lubricating system, which will automatically indicate to the driver whether or not lubricant is being fed.

Further objects, and objects relating to economies of manufacture and details of construction, will definitely appear from the detailed description to follow:

I accomplish the objects of my invention by the devices and means described in the following specification. My invention is clearly defined and pointed out in the appended claims:

A structure constituting a preferred embodiment of my invention is illustrated in the accompanying drawing, forming a part of this specification, in which:

Figure I is a side elevation showing an engine and lubricating system in which is connected the device constituting the subject matter of the present invention;

Fig. II is a transverse, vertical section through the indicating device on the line 2—2 of Fig. III;

Fig. III is a cross-sectional view through the indicating device taken on line 3—3 of Fig. II;

Fig. IV is a front elevation of the device; and

Fig. V is a detail perspective view of the indicating member.

Similar reference numerals indicate similar parts throughout the several views, and the sectional views are taken looking in the direction of the little arrows at the ends of the section lines.

Referring to the drawings: the lubricating system is shown in connection with a gasolene engine, designated generally by the numeral 10. The lubricant is pumped from the drip pan 11 of the engine, through a pipe 12, to a pump 13 operated by the engine. This pump may be of any desired construction. The lubricating oil is then pumped by the pump 13 through a pipe 14 to the oil gage 15, from which it is fed by gravity through a pipe 16 to the distributing connection 17, which may also be of any desired construction.

The oil gage comprises a cylindrical frame 18 forming a chamber 21, which is closed at its rear end by the rear wall 19, integral with the frame 18. The forward end of the frame 18 has a cylindrical flange 20 (Fig. II) which projects through an opening 23 of a supporting member 24, which may be the dash-board of the automobile. The flange 20 is externally threaded so that an internally threaded ring 25 may be screwed thereon. The rear end of the ring 25 contacts with the forward side of the dashboard 24, thereby holding the device in place. A plate 27 of glass or other transparent material is mounted in the ring 25, as is clearly shown in Fig. II, and serves to close the front end of chamber 21. A ring gasket 28, mounted between the forward end of flange 20 and the plate 27, forms a liquid seal for any oil which may accumulate in the chamber 21.

The pipe 14 is connected to a rearwardly extending nipple 29 integral with the top of the frame 18, and the pipe 16 is connected to a rearwardly extending nipple 29' integral with the lower end of the frame. A threaded opening 30 is provided in the upper end of the frame 18 and a cylindrical member 33 has an upwardly extending threaded stud 34 which is screwed into the lower end of the opening 30 to hold the member 33 in place in the chamber 21. A screw plug 35 closes the upper end of the opening. The member 33 is provided with a central bore 36 which is enlarged at its lower end to form an oil chamber 37. A sleeve 38 surrounds the member 33 and slides vertically on said member. The lower end of the sleeve is provided with a valve seat 39 on which is seated a ball valve 40. The upper end of the sleeve is provided with a flange 43 to which is fastened, in any desired way, an indicator 44. The indicator 44 has an opening 45 to receive the upper end of the sleeve 38, and its outer end is bent at right angles to the body thereof, and the vertical portion of the indicator carries the words "On" and "Off." The rear face of the glass 27 is painted, as shown in Figs. III and IV, but an oval sight opening 45 is left in the center of the glass.

A coiled spring 46 surrounds the sleeve 38 and is compressed between the horizontal portion of the indicator 44 and the bottom of the frame 18. An opening 47 is provided in the bottom of the frame 18, directly under the ball valve 40 and the port in the nipple 29 communicates with this opening. A screw stud 48 closes the bottom of the opening 47 and has a vertical pin 49, which projects slightly out of the opening 47 into the chamber 21. When the pump 13 is operated the oil is forced by the pump through the pipe 14, the passage in the nipple 29, and the opening 30 into the chamber 37 in the member 33. As the oil is pumped into the chamber 37, the chamber begins to fill because the ball valve 40 closes the lower end of the chamber. The pressure of the oil on the valve 40 and the lower end of the sleeve 38, lowers the sleeve gradually against the tension of the spring 46. The oil acts as a liquid seal between the member 33 and the sleeve 38 and prevents air from entering the sleeve, the pressure of the oil being depended upon entirely to regulate its flow to the connection 17. When the supply of oil in the lower end of the sleeve 38 reaches a certain volume the sleeve 38 is lowered enough to cause the ball valve 40 to contact with the upper end of the pin 49. When the ball valve 40 contacts with the pin 49, it is raised out of its seat, and oil is permitted to flow past the valve and drop into the opening 47 and pass through the nipple 29' and pipe 16 to the distributing connection 17 by gravity. As long as the pump continues to operate the oil flows continuously past the valve 40. The pressure of the oil, however, causes the valve to open more or less dependent upon the speed of the motor.

As long as the pump 13 is running and feeding oil through the lubricating system the pressure in the chamber 37 will be maintained and the sleeve 38 will be held in its lower position so that the valve 40 is open and the word "On" is visible through the sight opening 45. If the pump 13 stops, the pressure in the chamber 37 will be lowered at once and the spring 46 will lift the sleeve sufficiently so that the ball valve 40 will close and the word "On" will no longer be visible through the sight opening 45. In case the supply of lubricating oil should become exhausted so that the pump no longer forces any oil through the system the seal between the cylindrical member 33 and the sleeve 38 would be broken so that the sleeve 38 would be forced upwardly by the spring 46 and the word "Off" will appear through the sight opening. It is apparent, therefore, that this oil gage will automatically indicate whenever the lubricant ceases to flow through the system and, since it depends on the oil in the system to form the seal between the member 33 and the sleeve 38, it will indicate at once whenever such supply of oil is exhausted.

I am aware that the embodiment of my invention here shown and described is susceptible of considerable variation without departing from the spirit thereof, and therefore, I desire to claim the same broadly as indicated by the appended claims. I have found, however, that this particular embodiment is desirable from many standpoints and therefore, I desire to claim the same specifically as well as broadly as will appear from the appended claims.

Having thus described my invention, what I claim as new and desire to secure by Letters Patent is:—

1. An oil gage comprising the combination of a frame member, provided with a chamber therein, and a removable front plate with a sight opening therein, said frame member being provided with diametrically opposite inlet and outlet ports for said chamber; a block carried by said frame member within said chamber, having an oil chamber therein, and a passage connecting said oil chamber with said inlet port; a sleeve slidably mounted on said block, and provided with a valve seat at its lower end; a valve element normally seating thereon, and closing the lower end of said oil chamber; a spring disposed around said sleeve and tending to retain it in its upper position, a stud in said outlet port adapted to engage and unseat the valve element in the lower position of the sleeve; and an indicating member carried by said sleeve and carrying a legend adapted to be displayed through said sight opening.

2. An oil gage comprising the combination of a frame member, provided with a chamber therein, and a front plate having a sight opening therein, said frame member being provided with inlet and outlet ports for said chamber; a block carried by said frame member within said chamber, having an oil chamber therein, and a passage connecting said oil chamber with said inlet port; a sleeve slidably mounted on said block, and provided with a valve seat at its lower end; a valve element normally seating thereon, and closing the lower end of said oil chamber; a spring disposed around said sleeve and tending to retain it in its upper position; a stud in said outlet port adapted to engage and unseat the valve element in the lower position of the sleeve; and an indicating member carried by said sleeve and carrying a legend adapted to be displayed through said sight opening.

3. An oil gage comprising the combination of a frame member, provided with a chamber therein, and a front plate having a sight opening therein, said frame member being provided with an inlet and outlet port for said chamber; a block carried by said frame member within said chamber, having an oil chamber therein connected with said inlet ports; a sleeve slidably mounted on said block, and provided with a valve seat at its lower end; a valve element normally seating thereon and closing the lower end of said oil chamber; a spring disposed around said sleeve and tending to retain it in its upper position; a stud in said outlet port, adapted to engage and unseat the valve element in the lower position of the sleeve; and an indicating member carried by said sleeve, and carrying a legend adapted to be displayed through said sight opening.

4. An oil gage comprising the combination of a frame member, provided with a chamber therein, and a front plate, having a sight opening therein, said frame member being provided with inlet and outlet ports for said chamber; a block carried by said frame member within said chamber, having an oil chamber therein connected with said inlet port; a sleeve slidably mounted on said block and yieldingly held in its upper position, said sleeve being provided with a valve seat at its lower end; a valve element normally seating thereon and closing the lower end of said oil chamber; a stud in said outlet port adapted to engage and unseat the valve element in the lower position of the sleeve, and an indicating member carried by said sleeve, and carrying a legend adapted to be displayed through said sight opening.

5. An oil gage comprising the combination of a frame member, provided with a chamber therein, and a front plate having a sight opening therein, said frame member being provided with an inlet and outlet port for said chamber; a block carried by said frame member within said chamber and having an oil chamber therein connected with said inlet port; a sleeve slidably mounted on said block and yieldingly held in its upper position, said sleeve being provided with a valve seat at its lower end; a valve element normally seating thereon and closing the lower end of said oil chamber; means adapted to unseat said valve element in the lower position of the sleeve; and an indicating member carried by said sleeve and carrying a legend adapted to be displayed through said sight opening.

6. An oil gage comprising the combination of a frame member, provided with a chamber therein, and a front plate having a sight opening therein, said frame member being provided with inlet and outlet ports for said chamber; a block carried by said frame member within said chamber and having an oil chamber therein connected with said inlet port; a valve normally closing the lower end of said oil chamber; means adapted to automatically unseat said valve; and an indicating member, actuated by said valve unseating means, and carrying a legend adapted to be displayed through said sight opening.

7. An oil gage comprising the combination of a frame member, provided with a chamber therein, and a front plate having a sight opening therein, said frame member being provided with inlet and outlet ports for said chamber; a block carried by said frame member within said chamber and having an oil chamber therein connected with said inlet port; a movable member normally closing said oil chamber and provided with a valve; an indicating member carrying a legend adapted to be displayed through said sight opening and actuated by said movable member; and means adapted to unseat said valve at a predetermined position of the movable member.

8. The combination with a lubricating system; of a valve comprising a member having an oil chamber connected to the feed line, and an outer member slidably mounted on the first named member, the fluid in said chamber forming a seal between said members, a valve element normally seating in said slidable member, and closing the lower end of said chamber; means adapted to automatically unseat said valve when the pressure in said system reaches a predetermined point, and indicating means actuated by said movable member.

9. The combination with a lubricating system, of a member through which the oil is fed and which is movable responsive to the pressure in said system, a valve normally seating in and closing an opening in said movable member, means for automatically unseating said valve when the pressure in said system reaches a pre-determined point and indicating means controlled by said movable member.

10. The combination with a lubricating system, of a member through which the oil is fed and which is movable responsive to the pressure in said system, a valve normally seating in and closing an opening in said movable member, spring means tending to prevent movement of said member in one direction under the pressure of said system, means for automatically unseating said valve when the pressure in said system reaches a pre-determined point, and indicating means controlled by said movable element.

11. The combination with a lubricating system, of a member through which the oil is fed and which is movable responsive to the pressure in said system, a valve normally seating in and closing an opening in said movable member, stationary means engaged by said valve when the member is moved to a pre-determined position for automatically unseating said valve, and indicating means controlled by said movable member.

12. The combination with a lubricating system, of a member provided with a chamber therein, and having inlet and outlet ports, a block carried by said member within said chamber and having an oil chamber therein connected with said inlet port, a movable member normally closing said oil chamber, a valve in said movable member and means adapted to unseat said valve in a predetermined position of the movable member, and indicating means controlled by said movable member.

13. The combination with a lubricating system, two telescoping members forming an expansible oil chamber which is expansible responsive to the pressure in said system, a valve in said chamber automatically unseated at a pre-determined point of expansion of said chamber, and indicating means controlled by said expansible chamber.

14. In a lubricating system, means forming an expansible oil chamber continuously open to one side of the system, and a valve in said chamber adapted to be opened to the opposite side of the system automatically at a predetermined point of expansion of said chamber.

15. In a lubricating system, means forming an expansible oil chamber continuously open to one side of the system, a valve in said chamber automatically opened to the opposite side of the system at a predetermined point of expansion of said chamber, and an indicating device controlled by said means.

16. In a lubricating system, means forming an expansible oil chamber continuously open to one side of the system, spring means normally retaining said chamber in unexpanded position, a valve in said chamber which is automatically opened to the opposite side of the system at a predetermined point of expansion of said chamber, and an indicating device controlled by said means.

17. In a lubricating system, a member through which the oil is fed and which is movable responsive to the pressure in said system, a valve normally closing an opening in said movable member, and means for automatically unseating said valve when the pressure in said system reaches a predetermined point.

18. In a lubricating system, a member through which the oil is fed and which is movable responsive to the pressure in said system, a valve normally closing an opening in said movable member, spring means tending to prevent movement of said member in one direction under the pressure of said system, and means for automatically unseating said valve when the pressure in said system reaches a predetermined point.

19. In a lubricating system, a member through which the oil is fed and which is movable responsive to the pressure in said system, a valve normally closing an opening in said movable member, and stationary means engaged by said valve when the member is moved to a predetermined position for automatically unseating said valve.

20. In a lubricating system, a member provided with a chamber therein and having inlet and outlet ports, an element carried by said member within said chamber and having an oil chamber therein connected with said inlet port, a movable member normally closing said oil chamber, a valve in said movable member, and means adapted to unseat said valve in a predetermined position of said movable member.

21. In a lubricating system, two telescoping members forming an expansible oil chamber continuously open to one side of the system, said chamber being expansible responsive to the pressure in said system, and a valve in said chamber automatically unseated at a predetermined point of expansion of said chamber to open communication with the opposite side of the system.

22. In a lubricating system, means movable responsive to the pressure of said system to one side of said means, a valve for said means adapted to open communication with the opposite side of the system, and means for opening the valve when said first named means has been moved to a predetermined position.

23. In a lubricating system, means movable in response to the pressure in said system to one side of said means, a valve for said means adapted to open communication with the opposite side of the system, a device for opening said valve when said means has been moved to a predetermined position, and indicating means controlled by said movable means.

24. In a lubricating system, means movable in response to the pressure in said system, to one side of said means spring means normally opposing said movement, and a valve carried by said first named means and automatically opened at a predetermined point in the movement of said means to open communication with the opposite side of the system.

25. In a lubricating system, means movable in response to the pressure in said system to one side of said means, spring means normally opposing said movement, a valve carried by said first named means and automatically opened at a predetermined point in the movement of said means to open communication with the opposite side of the system, and indicating means controlled by said movable means.

In testimony whereof I affix my signature.

THOMAS J. KEHOE.